United States Patent [19]

Grodde et al.

[11] 4,212,794
[45] * Jul. 15, 1980

[54] AQUEOUS DRILLING FLUID

[75] Inventors: Karl-Heinz Grodde, Celle; Alfred Schulz, Hornbostel, both of Fed. Rep. of Germany

[73] Assignee: Deutsche Texaco Aktiengesellschaft, Hamburg, Fed. Rep. of Germany

[*] Notice: The portion of the term of this patent subsequent to Apr. 11, 1995, has been disclaimed.

[21] Appl. No.: 853,057

[22] Filed: Nov. 21, 1977

Related U.S. Application Data

[60] Division of Ser. No. 745,017, Nov. 26, 1976, Pat. No. 4,083,790, which is a continuation-in-part of Ser. No. 642,932, Dec. 22, 1975, abandoned, which is a continuation of Ser. No. 363,229, May 23, 1973, abandoned.

[30] Foreign Application Priority Data

May 23, 1972 [DE] Fed. Rep. of Germany ....... 2224959

[51] Int. Cl.$^2$ ............................ C09F 1/02; C09K 7/02
[52] U.S. Cl. ............................... 260/97.6; 252/8.5 C; 260/97; 260/97.5

[58] Field of Search ...................... 260/97, 97.5, 97.6; 252/8.5 C

[56] References Cited

U.S. PATENT DOCUMENTS

| | | | |
|---|---|---|---|
| 2,468,658 | 4/1949 | Dyke | 252/8.5 C |
| 2,530,810 | 11/1950 | Christensen et al. | 260/97.6 |
| 3,047,493 | 7/1962 | Rosenberg | 252/8.5 C |
| 3,049,491 | 8/1962 | Donham | 252/8.5 C |
| 3,066,160 | 11/1962 | Hampton | 260/97.6 |
| 3,284,352 | 11/1966 | Burdyn et al. | 252/8.5 C |
| 3,340,188 | 9/1967 | Barrett | 260/98 |
| 3,654,255 | 4/1972 | Koebner | 260/97.6 |

FOREIGN PATENT DOCUMENTS 690372  7/1964 Canada ............................... 252/8.5 C Primary Examiner—H. S. Cockeram
Attorney, Agent, or Firm—Carl G. Ries; Robert A. Kulason; James F. Young

[57] ABSTRACT

This invention relates to an aqueous drilling fluid containing a tall oil fraction as a lubricating additive, a method of drilling with said drilling fluid containing said tall oil lubricating additive and the tall oil lubricating additive per se.

2 Claims, No Drawings

AQUEOUS DRILLING FLUID

This application, Ser. No. 853,057, is a divisional application of continuation-in-part application Ser. No. 745,017 filed Nov. 26, 1976, now U.S. Pat. No. 4,083,790, which was in turn a continuation-in-part application of copending application Ser. No. 642,932 filed Dec. 22, 1975, now abandoned, which in turn was a continuation of application Ser. No. 363,229, filed May 23, 1973, now abandoned.

The present invention relates to a lubricant for aqueous drilling fluids and to a drilling fluid containing the novel lubricant.

It is known to add a lubricant, having a high affinity for metal and capable of wetting metallic materials, to aqueous drilling fluids or muds. Some of the difficulties encountered in the drilling of wells, such as solidification due to differential pressure in permeable formations, high torques, excess loads upon drawing, and clay sticking to the drilling string and to the drilling tool or bit, may be reduced by adding a suitable lubricant to the drilling fluid.

It has hitherto generally been the practice to use from 5% to 10% mineral oil as a lubricant. However, this has the substanial disadvantage that the ground (underground) water may become polluted. For this reason, many municipal authorities already forbid the use of mineral oils such as lubricants in well drilling fluids. The use of other suitable lubricants such as petroleum sulphonates has also been prohibited in a number of states in the Federal Republic. The use of pulverulent graphite as a lubricant has also been unsatisfactory.

It has recently been proposed to use a triglyceridealcohol mixture as a means of reducing the torque of well drilling fluids. However, this mixture does not have the desired effect and, in addition, causes undesirable foaming.

Tall oil has also been used as a lubricant heretofore in drilling fluids. The tall oil serves as an emulsifier in emulsion drilling fluids, both in oil-in-water and in water-in-oil systems. Tall oil and products of tall oil have also been used in aqueous drilling fluids. Thus, for example, an aqueous drilling fluid or mud to which a small amount of "floating soap" is added, is described in U.S. Pat. No. 3,049,491, the "floating soap" being a commercially obtainable, water-soluble tall oil soap in granulated form. Such soap has, however, the substantial disadvantage of vigorous foaming. In the U.S. Pat. No. 3,340,188 a sulphonated tall oil residue as an additive for aqueous drilling fluids is disclosed to reduce filter loss, viscosity and the coefficient of friction. However, the lubricating action of this material has not been found to be wholly satisfactory.

In U.S. Pat. No. 3,047,492 it is proposed to use "carboxylic acid compounds", dispersed with clay, bentonite or the like, as a lubricant for aqueous drilling fluids. The term "carboxylic acid compounds" comprises long-chain saturated and unsaturated fatty acids, triglycerides of fatty acids, rosin acids, tall oil, tall oil distillation residues (tall oil pitch), and purified tall oil. The lubricating action resulting from the use of such materials has been generally unsatisfactory.

It is an object of the invention to provide an improved lubricant for aqueous drilling fluids, which lubricant is capable of biological decomposition, is economical, does not foam and which exhibits a lubricating action superior to that of the known prior art lubricants.

The object is met by using as a lubricant for aqueous drilling fluids a tall oil fraction having a high rosin acid content and containing not more than about 25% of fatty acids and fatty oils. Surprisingly, it has been found that the effectiveness of such tall oil fraction as the lubricant is superior to that of any known lubricant. A suitable tall oil fraction may be obtained by separating from tall oil some of the fatty acids and fatty oils. The fatty acids and fatty oils are separated until the remaining fatty acids and fatty oils constitute about 10 to 25% by weight, the balance being from about 35 to 85% of rosin acids, the remaining balance being unsaponifiables and neutrals, on a weight basis. These fatty acid and fatty oils constituents are separated to an extent sufficient to ensure that the residual portion thereof present in the tall oil fraction does not exceed about 25% by weight. Preferably fractional distillation is used to effect the separation. The rosin acid content of the novel lubricant according to the invention should be in excess of 40% by weight, preferably from 50–80%, for effective results. The following analyses of two tall oil fractions suitable for use as lubricants, according to the invention, are given by way of example. These tall oil fractions were obtained by fractional distillation:

Initial boiling point: 110°–130° C. at 1.5 mm. Hg.
Final boiling point: 185°–195° C. at 0.5 mm. Hg.

EXAMPLE 1

Neutralisation number 107; Saponification number 135; Iodine number 215; Hydroxyl number 38; Specific gravity 0.95; and Flash point 160°–185° C.

A tall oil fraction having a low neutralisation number and a low saponification number referred to in the following Example 2 has also produced good results:

EXAMPLE 2

Neutralisation number 91 and Saponification number 102.

In the novel lubricant of the present invention it is particularly preferred that the difference between the neutralisation number and the saponification number is preferably below about 30.

It has also been found that only very small amounts of the novel tall oil fraction having a high rosin acid content and substantially free from fatty acids and fatty oils need be added to aqueous drilling fluids in the order of 0.45 to 3% by volume being sufficient to produce a lubricating action superior to that obtained by the known lubricants. The drilling fluid containing the lubricant is advantageously maintained at a pH below 9. The lubricant may, however, also be used in highly alkaline drilling fluids.

In accordance with the invention it is desirable that from 0.5 to 5% by weight of an aromatic or an aromaticcontaining hydrocarbon is preferably added to the novel tall oil fraction in order to suppress the foaming tendency of highly alkaline fluids. Suitable materials are benzene, toluene and xylene.

In addition to its lubricating action, the additive according to the invention is biologically decomposable and thus also meets a condition of vital importance to the prevention of environmental pollution. It is, moreover, less costly than the hitherto known lubricants for aqueous drilling fluids.

The lubricating action of the tall oil fraction according to the invention is illustrated below with reference to comparative laboratory tests. In the following description, the term "tall oil fraction" always means a tall oil fraction which meets the aforementioned conditions, namely a fraction having a high rosin acid content and a low content of fatty acids and fatty oils.

The following lubricants were compared with the tall oil fraction:
  Mineral oil;
  A petroleum sulphonate;
  Dehydroxylated castor oil,
  A triglyceride/alcohol mixture;
  Very finely powdered graphite;
  Last runnings of alkylbenzene.
  Methyl oleate.

These materials were tested as lubricating additives in the following aqueous drilling fluids:

| | |
|---|---|
| Synthetic clay fluid 1: | specific gravity: 1.17: it contained 50 grams bentonite and 250 grams clay dust per liter of water. |
| Clay fluid 2: (Well A3) | specific gravity: 1.13: it contained exclusively bentonite and clays. |
| Clay Fluid 3: (Well B1) | specific gravity: 1.16: it contained bentonite, clays and about ½% of lignosulphonate. |
| Clay/salt water fluid: | specific gravity: 1.58: the fluid was saturated with NaCl, contained 30 grams of carboxymethyl cellulose per liter, had a commercial degree of purity and was loaded with baryte. |

The lubricating action was determined by means of a known Baroid EP tester, that is a Timken tester of the kind generally used for testing lubricities. In this apparatus, a face-ground surface of a test body of steel provided on a lever arm is pressed against a case-hardened steel ring secured to the shaft of a motor. The current consumption of the motor is dependent upon the pressure applied by the test surface to the ring and the dimensions of the notch ground into the test body after a determined running time were measured. While this test procedure does not provide an absolute criterion for the complex quality of "lubricity", it nevertheless has been found to demonstrate the effectiveness or non-effectiveness of the additives as lubricants in well drilling fluids. When a number of preliminary tests had been carried out, the following test method based on T. C. Mondshine's paper in the August 1971 issue of "World Oil", was selected. A constant load of 172.8–345.6 cm. kg. (150 or 300 inch-pounds) was maintained for three minutes and the amperage consumption and the notch formed were measured. When the lubricity of the initial fluid, for example the loaded clay/salt water fluid, was relatively satisfactory, a load of 345.6 cm. kg (300 inch-pounds) was applied in order to facilitate detection of the effect of the lubricants. In the Tables, the current strengths upon idling, 1.0 A at the beginning of the test and 0.9 A after a running time of three minutes, have previously been deducted. Thus ΔA is directly proportional to the frictional force. The highest amperage was obtained at the beginning of the application of load; the amperage dropped to a substantially constant minimum value after barely one minute. A few short-time current surges occurring only at high friction were not evaluated.

RESULTS

The results of tests carried out in an EP-tester with the different fluids are shown in the following Tables 1 to 4. One-third of the current consumption ΔA is approximately identical with the "lubricity coefficient" defined by T. C. Mondshine, or one-sixth of ΔA at the higher contact pressure of 345.6 cm. kg. (300 inch-pounds). The concentrations are given in percentages by volume.

Table 1 also shows representative values obtained with a conventional oil base drilling fluid for purposes of comparison.

Table 1

Clay fluid 1, specific gravity = 1.17

| Additive % by vol. | | Current consumption ΔA | Length of notch mm. |
|---|---|---|---|
| NIL | | 1.8 | 5.7 |
| 7% | mineral oil | 1.6 | 5.1 |
| 0.45% | petroleum sulphonate | 1.5 | 5.5 |
| 1.2% | petroleum sulphonate | 1.5 | 5.6 |
| 2% | graphite | 1.8 | 5.7 |
| 0.45% | tall oil fraction | 0.6 | 3.7 |
| 1.2% | tall oil fraction | 0.2 | 1.2 |
| 0.45% | dehydrated castor oil | 0.5 | 3.4 |
| 1.2% | dehydrated castor oil | 0.25 | 1.0 |
| 0.45% | methyl oleate | 1.6 | 5.7 |
| 0.45% | castor oil | 1.7 | 5.9 |
| Oil base drilling fluid | | 0.25 | 0.7 |

Table 2

Clay fluid 2, specific gravity = 1.13

| Additive % by vol. | Current consumption ΔA | Length of notch mm. |
|---|---|---|
| NIL | 2.0 | 5.5 |
| 7% mineral oil | 1.6 | 3.7 |
| 1% petroleum sulphonate | 1.5 | 3.7 |
| 1% Triglyceride/alcohol mixture | 0.35 | 2.1 |
| 1% tall oil fraction | 0.35 | 2.0 |

Table 3

Clay Fluid 3, specific gravity = 1.16

| Additive % by vol. | Current consumption ΔA | Length of notch mm. |
|---|---|---|
| NIL | 1.6 | 4.8 |
| 7% mineral oil | 1.6 | 4.4 |
| ½% petroleum sulphonate | 1.6 | 4.6 |
| 3% petroleum sulphonate | 0.75 | 2.4 |
| 3% graphite | 1.0 | 2.7 |
| 2% triglyceride/alcohol mixture | 1.35 | 4.5 |
| ½% tall oil fraction | 0.45 | 2.0 |
| 2% tall oil fraction | 0.40 | 1.6 |
| ½% dehydrated castor oil | 0.75 | 2.1 |
| 2% alkylbenzenes | 1.6 | 5.0 |
| Field fluid from a depth of 3070 meters containing about 0.8% of the tall oil fraction | 0.5 | 2.3 |

Table 4

Clay/salt water flushing fluid 3, specific gravity 1.58
Load applied: 345.6 cm. kg. (300 inch-pounds)

| Additive % by vol. | | Current consumption ΔA | Length of notch mm. |
|---|---|---|---|
| NIL | | 1.4 | 3.2 |
| 3% | petroleum sulphonate | 1.3 | 2.7 |
| ⅜% | tall oil fraction | 1.0 | 2.8 |
| 3% | tall oil fraction | 0.7 | 2.0 |
| 3% | dehydrated castor oil | 0.95 | 2.5 |
| ⅜% | triglyceride/alcohol | 1.3 | 3.1 |

Table 4-continued

Clay/salt water flushing fluid 3, specific gravity 1.58
Load applied: 345.6 cm. kg. (300 inch-pounds)

| Additive % by vol. | Current consumption ΔA | Length of notch mm. |
|---|---|---|
| mixture | | |
| 3% triglyceride/alcohol | 0.7 | 2.0 |
| mixture | | |

The preceding Tables show clearly that the action of the tall oil fraction according to the invention attains substantially the ideal lubricating action of a standard oil flush and is superior to the action of any other additive. In ordinary clay fluids, dehydrated castor oil and the triglyceride/alcohol mixture had substantially the same effect as the tall oil fractions, their action in the clay/salt water fluid being, however, clearly less successful. Moreover, these two additives are substantially more costly than the tall oil fraction.

In order to determine whether the tall oil fraction according to the invention entailed an advance over the lubricants disclosed in the previously mentioned patent for aqueous drilling fluids, further laboratory tests were carried out in which the fraction was compared with crude tall oil, sulphonated tall oil, distilled tall oil, tall oil residue, tall oil fatty acid, fatty acid, calcium soap, fatty acid sodium soap, rosin acid calcium soap, rosin acid sodium soap, olein, stearic acid and fatty acid triglyceride. The tests were carried out with a clay fluid of poor lubricating properties by the same method as that employed in the preceding tests. The result of these tests is given in the following Table 5.

Table 5

Clay fluid, specific gravity = 1.17 g/ml, pH value 8.5
50 grams bentonite + 200 grams natural clay
per liter of water

| Additive | % by vol. | Current consumption ΔA | Length of notch mm. |
|---|---|---|---|
| NIL | NIL | 2.8 | 6.8 |
| Tall oil fraction according to the invention | 1 | 0.65 | 2.0 |
| Tall oil, crude | 1 | 1.6 | 5.0 |
| Sulphonated tall oil | 1 | 1.6 | 5.0 |

Table 5-continued

Clay fluid, specific gravity = 1.17 g/ml, pH value 8.5
50 grams bentonite + 200 grams natural clay
per liter of water

| Additive | % by vol. | Current consumption Δ A | Length of notch mm. |
|---|---|---|---|
| Tall oil distillate | 1 | 1.2 | 4.0 |
| Tall oil residue (*1) | 1 | 2.0 | 5.4 |
| plus diesel oil | 4 | | |
| Tall oil fatty acid | 1 | 1.2 | 3.2 foamy |
| Fatty acid calcium-soap | 0.1 | 2.9 | 6.5 |
| Fatty acid Ca soap | 1.2 | 2.7 | 6.2 |
| Fatty acid sodium soap (*2) | 0.1 | 2.5 | 6.5 |
| Rosin acid Ca soap | 0.1 | 2.8 | 6.7 |
| Rosin acid Ca soap | 1.2 | 2.7 | 6.7 |
| Rosin acid Na soap (*2) | 0.1 | 2.7 | 6.7 |
| Special olein | 1 | 1.0 | 3.0 foamy |
| Stearic acid | 1 | 1.2 | 4.2 |
| Fatty acid triglyceride | 1 | 1.6 | 4.8 |

(*1) Dispersion of the pitch-like tall oil residue was impracticable. For this reason, it was dissolved in four times its volume of diesel oil. However, this oil addition failed to meet the requirement of rapid biological decomposability. The insoluble calcium soaps, whether they were fatty acid or rosin acid calcium soaps, produced no appreciable results either in low or in high concentration.

(*2) Additions of 1% of fatty acid sodium soap and of rosin acid sodium soap caused such vigorous foaming upon being mixed with the fluid that no meaningful data could be obtained.

The data in the above Table 5 show that the lubricity of the tall oil fraction according to the invention is far superior to that of any other tall oil product.

The novel tall oil fractions were also field tested. The tall oil fraction was added to the drilling fluids in a concentration of about one percent by volume as from the particular depth at which difficulties caused by thick sandy formations were to be expected. As the drilling operations continued, the tall oil fraction was added in batches of one 200 liter barrel a time upon renewal of the drilling fluid through a tank filled with from 20 to 80 cubic meters of diluent to maintain a concentration of almost 1% by volume. The most important data of the wells are shown in Table 6. The previously drilled wells are not directly comparable with respect to the drilled rock, the progress of drilling, the torque and other drilling conditions.

Table 6

The use of tall oil fraction according to the invention as a lubricant for drilling fluids.

| Well | Section drilled with 8½" bit from meters | to | Consumption of tall oil fraction added as from a depth of meters | tons (short tons) | Drilling fluid specific gravity |
|---|---|---|---|---|---|
| Field A No. 1 | 445 – | 1140 | 700 | 1.8 (1.98) | 1.15 |
| Field A No. 2 | 448 – | 1490 | 700 | 2 (2.2) | 1.15 |
| Field A No. 3 | 458 – | 1490 | 700 | 2.2 (2.42) | 1.15 |
| Field B No. 1 | 607 – | 3077 | 720 | 10 (11) | 1.18 |
| Field C No. 1 | 710 – | 2644 | 1100 | 4 (4.4) | 1.45 |
| Field D No. 1 | 710 – | 3115 | 1980 | 4.5 (4.95) | 1.25 |
| Field D No. 2 | 2650 – | 3118 | 2830 | 3 (3.3) | 1.25 |

The resulting observations may be summarised as follows:

No lubricant was used in the previously drilled wells in Field A. Some wells which had consolidated as a result of differential pressure, were re-opened by an introduction of a batch of diesel oil or oil fluid. Deposits of oil-containing waste fluid contributed considerably to the conditions under which the ground water pollution hazard may be avoided.

In wells in Field A, graphite served as a lubricant for the purpose of reducing the torque; however, it was found to be ineffective. About 7% of waste engine oil, that is from 38 to 40 tons (41.8 to 44 short tons) per well, were used in previously drilled wells in Field C. The costs considerably exceeded the costs of the tall oil fraction used in Well C1. In Well C2, which is at the present time in operation, 1% by volume of the novel tall oil fraction was added to the drilling fluid at the top of the permeable chalk formation at a depth of 1100 m.

The torque generated at the drill string was thereby reduced to about 60% of its previous value. An excess load of from 25 to 30 tons was previously required to be applied to each drilling bar at a depth of from 1700 to 1750 meters during the upward movement after the drilling operation. After addition of 0.5% by volume of the tall oil fraction, no excess load was needed in pulling the drill string.

Well D1 and Diversion D2 were drilled. Difficulties due to differential pressure were avoided despite the performance of a number of catching or fishing operations occasioned by breaks in the drilling string and by the loss of chisel rollers by the addition of the tall oil fraction to the well drilling fluid. In Well D2, a substantial improvement with respect to the generation of high torques was obtained by an addition of the tall oil fraction.

According to these laboratory and field test results the novel tall oil fraction produced the most satisfactory results with respect to the improved lubricity of an aqueous drilling fluid containing same. At a concentration of one percent by volume it substantially attained the ideal lubricity of an oil base drilling fluid.

We claim:

1. An aqueous drilling fluid lubricating additive consisting of a fractionally distilled tall oil fraction lubricating additive having a fatty acids and fatty oils content of from about 10 to about 25% by weight, a rosin acids content of from about 50% to about 80% by weight, the balance being unsaponifiables and neutrals, said lubricating additive having an initial boiling point in the range of from about 110° to 130° C. at 1.5 mm. Hg., and a final boiling point in the range of from about 185° to 195° C. at 0.5 mm. Hg., the neutralization number thereof being in the range of from about 90 to about 107 and the saponification number being in the range of from about 102 to about 135, and wherein the difference between the neutralization number and the saponification number of said lubricating additive is below 30, said lubricating additive being nonfoaming in an aqueous drilling fluid at a pH up to about 9.

2. An aqueous drilling fluid lubricating additive as claimed in claim 1 wherein the difference between the neutralization number and the saponification number is below 12.

* * * * *